US012761776B2

(12) United States Patent
Sylwander et al.

(10) Patent No.: US 12,761,776 B2
(45) Date of Patent: Oct. 13, 2026

(54) ACTION VERIFICATION BY A COMMUNICATION DEVICE ENABLED FOR SHORT-RANGE WIRELESS COMMUNICATION

(71) Applicant: CRUNCHFISH DIGITAL CASH AB, Malmö (SE)

(72) Inventors: Kristian Sylwander, Bunkeflostrand (SE); Paul Cronholm, Malmö (SE)

(73) Assignee: CRUNCHFISH DIGITAL CASH AB, Malmö (SE)

( * ) Notice: Subject to any disclaimer, the term of this patent is extended or adjusted under 35 U.S.C. 154(b) by 1028 days.

(21) Appl. No.: 17/920,587

(22) PCT Filed: Apr. 23, 2021

(86) PCT No.: PCT/SE2021/050374
§ 371 (c)(1),
(2) Date: Oct. 21, 2022

(87) PCT Pub. No.: WO2021/215993
PCT Pub. Date: Oct. 28, 2021

(65) Prior Publication Data
US 2023/0152948 A1 May 18, 2023

(30) Foreign Application Priority Data
Apr. 24, 2020 (SE) .................................... 2050469-2

(51) Int. Cl.
*G06F 3/0484* (2022.01)
*H04L 65/1069* (2022.01)
*H04L 65/61* (2022.01)

(52) U.S. Cl.
CPC ........ *G06F 3/0484* (2013.01); *H04L 65/1069* (2013.01); *H04L 65/61* (2022.05)

(58) Field of Classification Search
CPC .... G06F 3/0484; H04L 65/61; H04L 65/1069
See application file for complete search history.

(56) References Cited

U.S. PATENT DOCUMENTS 8,965,281 B2 * 2/2015 Raisanen ............ G06Q 20/352 455/41.2
9,369,567 B2 * 6/2016 Yoon .................... G06F 3/0346
(Continued)

FOREIGN PATENT DOCUMENTS

WO WO-2017160871 A1 * 9/2017 ......... H04N 21/8586
WO 2019009804 A1 1/2019
WO 2019108595 A1 6/2019

OTHER PUBLICATIONS

Google Developers, Manage connections, Nearby Connections API, https://developers.google.com/nearby/connections/android/manage-connections#authenticate_a_connection.
(Continued)

*Primary Examiner* — David E Choi
(74) *Attorney, Agent, or Firm* — Burr & Forman

(57) ABSTRACT

A communication device (100; 100*a*) has a processing device (110), a user interface (120), and a short-range wireless communication transceiver (130). The short-range wireless communication transceiver (130) is configured for receiving a short-range wireless communication signal(S) from another communication device (100*b*). The processing device (110) is configured for reading a communication identifier (CI) of the received short-range wireless communication signal (S), determining-based on the communication identifier (CI)—a particular audio/visual/audiovisual media content (140*a*) among a plurality of possible media contents (140), controlling the user interface (120) to present the particular media content (140*a*) to a user (1*a*) of the communication device (100; 100*a*), and controlling the user interface (120) to receive an input (INP) from the user (1*a*).
(Continued)

Conditionally upon having received the input (INP) from the user (1*a*), the processing device (110) is configured for causing the communication device (100; 100*a*) to perform an action (ACT).

32 Claims, 10 Drawing Sheets

(56) References Cited

U.S. PATENT DOCUMENTS

| | | | | |
|---|---|---|---|---|
| 10,839,368 | B2 * | 11/2020 | Granbery | G06Q 20/3829 |
| 10,840,975 | B2 * | 11/2020 | Smets | G06Q 20/382 |
| 11,569,630 | B2 * | 1/2023 | Hamamoto | H01S 3/0407 |
| 11,699,145 | B1 * | 7/2023 | Yang | G06Q 20/1085 235/379 |
| 2008/0194298 | A1 * | 8/2008 | Panabaker | H04W 4/80 455/566 |
| 2010/0061294 | A1 | 3/2010 | Proctor, Jr. et al. | |
| 2013/0268378 | A1 * | 10/2013 | Yovin | G06Q 20/4012 705/18 |
| 2016/0105728 | A1 * | 4/2016 | Schmidmer | H04N 21/64723 725/110 |
| 2016/0224973 | A1 * | 8/2016 | Van Os | G06Q 20/3224 |
| 2017/0032375 | A1 * | 2/2017 | Van Os | G06Q 20/4014 |
| 2017/0272824 | A1 * | 9/2017 | Bunner | H04N 21/8586 |
| 2018/0132088 | A1 * | 5/2018 | Lee | H04W 4/80 |
| 2018/0183840 | A1 | 6/2018 | Lee | |
| 2021/0125178 | A1 * | 4/2021 | James | G06Q 20/02 |
| 2021/0209196 | A1 * | 7/2021 | Arana | G06F 21/335 |

OTHER PUBLICATIONS

International Search Report and Written Opinion of corresponding international application No. PCT/SE2021/050374 mailed May 21, 2021.

* cited by examiner

600
A method of verifying an action (ACT) to be performed by a communication device (100; 100a) capable of short-range wireless communication:

ACTION VERIFICATION BY A COMMUNICATION DEVICE ENABLED FOR SHORT-RANGE WIRELESS COMMUNICATION

TECHNICAL FIELD

The present invention generally relates to the field of short-range wireless communication devices. More particularly, the present invention relates to a communication device that comprises a processing device, a user interface and a short-range wireless communication transceiver. The present invention also relates to method of verifying an action to be performed by a communication device which is capable of short-range wireless communication. Moreover, the invention relates to an associated computer program product and computer readable medium.

BACKGROUND

As everybody knows, there has been an overwhelming market penetration for mobile communication devices such as smartphones and tablets during the last decade. Long gone are the days when mobile communication devices were used primarily for voice calls. Typically, communication devices are enabled for broadband RF communication with remote entities, for instance via cellular systems like 5G, UMTS or GSM, or via wireless local area network (WLAN) access for routing IP traffic to and from such remote entities. In addition, communication devices are often enabled for short-range wireless communication, such as Bluetooth, with other devices nearby. Such a nearby device may be an accessory or peripheral device, like a wireless headset or wireless speakers.

Alternatively, a nearby device may be another communication device with which the present communication device communicates in a peer-to-peer setup in order to perform a digital service, such as sharing of information, purchasing goods or services, digitally signing identities, transferring of funds, etc.

In addition, such a nearby device may be a communication device in the form of a service terminal, the services of which can be accessed from the present communication device by way of short-range wireless communication. Some typical scenarios include digital order, digital payment or digital promotion at retail shops, supermarkets, arenas, events or public transportations, wherein the service terminal may be a point-of-sales terminal, checkout counter, delivery pickup point, vending machine, ticket machine, etc.

Communication with a nearby communication device is often ad hoc or infrequent in the sense that it a) can occur only when there is physical proximity between the devices, b) typically has a limited duration, and c) is often of a one time-nature rather than recurring. In the light of this, there will often be a degree of uncertainty for a user of a communication device when short-range wireless communication is to be established with another communication device, or when a certain action is to be taken by the user during such short-range wireless communication. One reason for such uncertainty may be that there can very well be other communication devices in the neighborhood, all possibly within range for short-range wireless communication. The user may wish to be assured that the nearby device that he thinks he will interact with, is in fact this particular nearby device and not another nearby device (possibly one that is not visible to the user but still within communicative reach, e.g. being located right outside the physical space where the user is present).

The present inventors have realized that there is room for improvements in this regard. Hence, the present inventors have identified both the need for and the benefits of a novel and inventive manner of allowing verification of an action to be performed by a communication device which is capable of short-range wireless communication.

SUMMARY

It is accordingly an object of the invention to solve, eliminate, alleviate, mitigate or reduce at least some of the problems and shortcomings referred to above.

A first aspect of the present invention is a communication device that comprises a processing device, a user interface and a short-range wireless communication transceiver. The short-range wireless communication transceiver is configured for receiving a short-range wireless communication signal from another communication device. The processing device is configured for reading a communication identifier of the received short-range wireless communication signal, determining-based on the communication identifier-a particular audio/visual/audiovisual media content among a plurality of possible media contents, controlling the user interface to present the particular media content to a user of the communication device, and controlling the user interface to receive an input from the user. The processing device is finally configured for causing, conditionally upon having received the input from the user, the communication device to perform an action.

The determining, by the processing device, of the particular audio/visual/audiovisual media content among the plurality of possible media representations beneficially occurs locally in the communication device. The communication identifier, or a part thereof, is used as a reference by means of which the particular audio/visual/audiovisual media content can be identified, chosen or generated locally in the communication device.

The plurality of possible media contents beneficially represents a finite group of different media contents. Each individual media content in the finite group of different media contents is such that, upon being presented as the particular media content in the user interface of the communication device, the individual media content is distinctly discernible from all other media contents in the finite group of different media contents by the user of the communication device.

Advantageously, the input is received as an inspection result of the user's verification of a match between the presented particular media content and a corresponding particular media content being presented by or at the other communication device.

The provision of such a communication device will solve or at least mitigate one or more of the problems or drawbacks identified in the background section of this document, as will be clear from the following detailed description section and the drawings. Hence, the invention will facilitate for the user of the communication device to verify that the action will be performed in a controlled manner. For instance, the user may benefit from being able to verify that the action is performed with respect to the correct entity, i.e. the aforementioned other communication device, and not with another entity by mistake or confusion. Another example is that the user may benefit from being able to verify that the action is about to be performed, rather than performing the action automatically when triggered by the short-range wireless communication signal from the other communication device.

To facilitate further for the user, the plurality of possible media contents may advantageously be differentiated by different colors, wherein the particular media content may be presented in the user interface as a display screen background, or an object shown as a display screen foreground, being of a certain color among these different possible colors.

Alternatively, the plurality of possible media contents may advantageously be differentiated by different sounds, wherein the particular media content may be presented in the user interface as a certain sound among these different possible sounds.

Another beneficial option is to let the plurality of possible media contents represent different graphical objects, wherein each graphical object is composed of a combination of a limited number of differently sized and/or oriented blocks. Accordingly, even a user that suffers from color blindness may benefit from being able to verify the action as described above.

As will be clear from the detailed description and the drawings, in some embodiments the short-range wireless communication signal is received during connectivity advertisement or discovery, and performing the action involves establishing a short-range wireless communication session with the other communication device.

In other embodiments, the short-range wireless communication signal is received as data traffic over an established (i.e., already existing) short-range wireless communication session with the other communication device, wherein the data traffic comprises a service invitation from the other communication device. In such embodiments, performing the action may involve participating in a digital service with the other communication device over the short-range wireless communication session. The digital service may for instance pertain to a payment transaction, a transaction for transfer of funds, an information exchange, an identity authentication, or an access authorization. Alternatively, performing the action may involve sending a data response to the other communication device in response to a data request included in the data traffic.

In yet other embodiments, performing the action may involve invoking or executing software or firmware instructions that are stored locally in the communication device, i.e. performing a local action in the communication device.

In still other embodiments, performing the action may involve broadband communication with a remote communication device, wherein the performed action may be part of a remote digital service provided by the remote communication device.

A second aspect of the present invention is a method of verifying an action to be performed by a communication device capable of short-range wireless communication. The method comprises:

- receiving a short-range wireless communication signal from another communication device;
- reading a communication identifier of the received short-range wireless communication signal;
- determining, based on the communication identifier, a particular audio/visual/audiovisual media content among a plurality of possible media contents;
- controlling a user interface of the communication device to present the particular media content to a user of the communication device;
- controlling the user interface to receive an input from the user; and
- conditionally upon having received the input from the user, causing the communication device to perform the action.

The method according to the second aspect of the invention may generally involve any or all of the functionality provided for the communication device according to the first aspect of the invention.

A third aspect of the present invention is a computer program product comprising computer code for performing the method according to the second aspect of the invention when the computer program code is executed by a processing device.

A fourth aspect of the present invention is a computer readable medium having stored thereon a computer program comprising computer program code for performing the method according to the second aspect of the invention when the computer program code is executed by a processing device.

Other aspects, objectives, features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout. Elements illustrated as hatched boxes are generally to be seen as optional in the particular drawing in which they appear.

Figure 1:
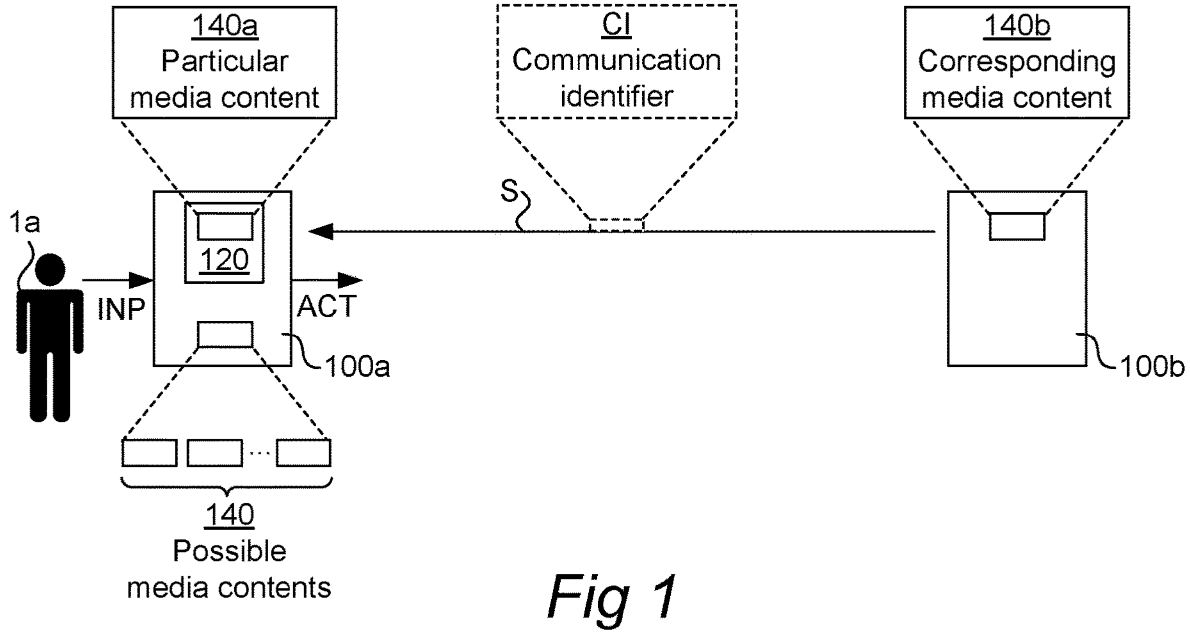
FIG. 1 is a schematic diagram of the general principles of the present invention.

Reference is first made to FIG. 1, showing a schematic diagram that illustrates general principles of the present invention. At the same time, reference will be made to FIG. 6 which shows a schematic flowchart diagram of a method 600 according to embodiments of the present invention, and to FIG. 5 which is a schematic block diagram of a communication device 100 in embodiments of the present invention.

In FIG. 1, a communication device 100*a*, operated by a user 1*a*, receives a short-range wireless communication signal S from another nearby communication device 100*b* pursuant to Bluetooth, BLE (Bluetooth Low Energy), RFID, WLAN, WiFi, mesh communication, or another form of proximity-based device-to-device radio communication such as LTE Direct.

Figure 5:
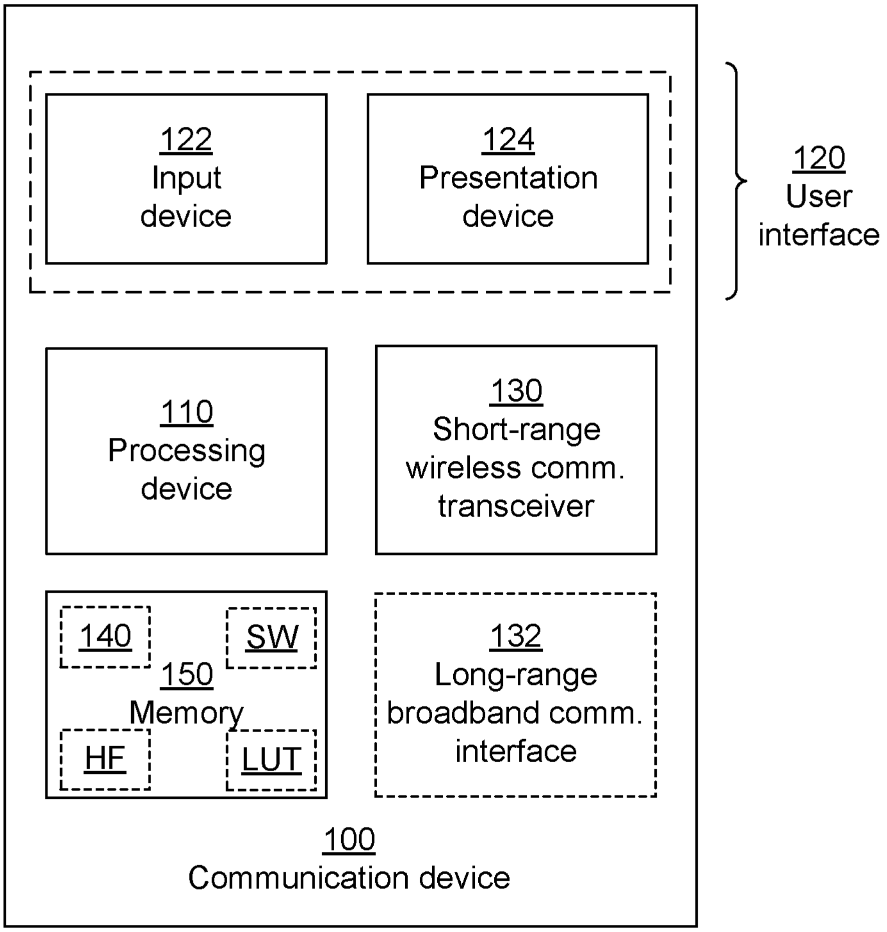
FIG. 5 is a schematic block diagram of a communication device in embodiments of the present invention.

An exemplary implementation of the communication device 100*a* is given in FIG. 5 in the form of a communication device 100. As can be seen, the communication device 100; 100*a* comprises a processing device 110, a user interface 120, a short-range wireless communication transceiver 130 and a memory 150.

The user interface 120 comprises an input device 122 and a presentation device 124, as is generally known. In some embodiments, the input device 122 and the presentation device 124 are constituted by one common physical device, such as for instance a touch screen (touch-sensitive display screen), implemented in for instance resistive touch technology, surface capacitive technology, projected capacitive technology, surface acoustic wave technology or infrared technology.

Pursuant to the invention, the short-range wireless communication transceiver 130 is configured for receiving the short-range wireless communication signal S from another communication device 100*b*. This can be seen in step 610 in the flowchart diagram of FIG. 6.

Figure 6:
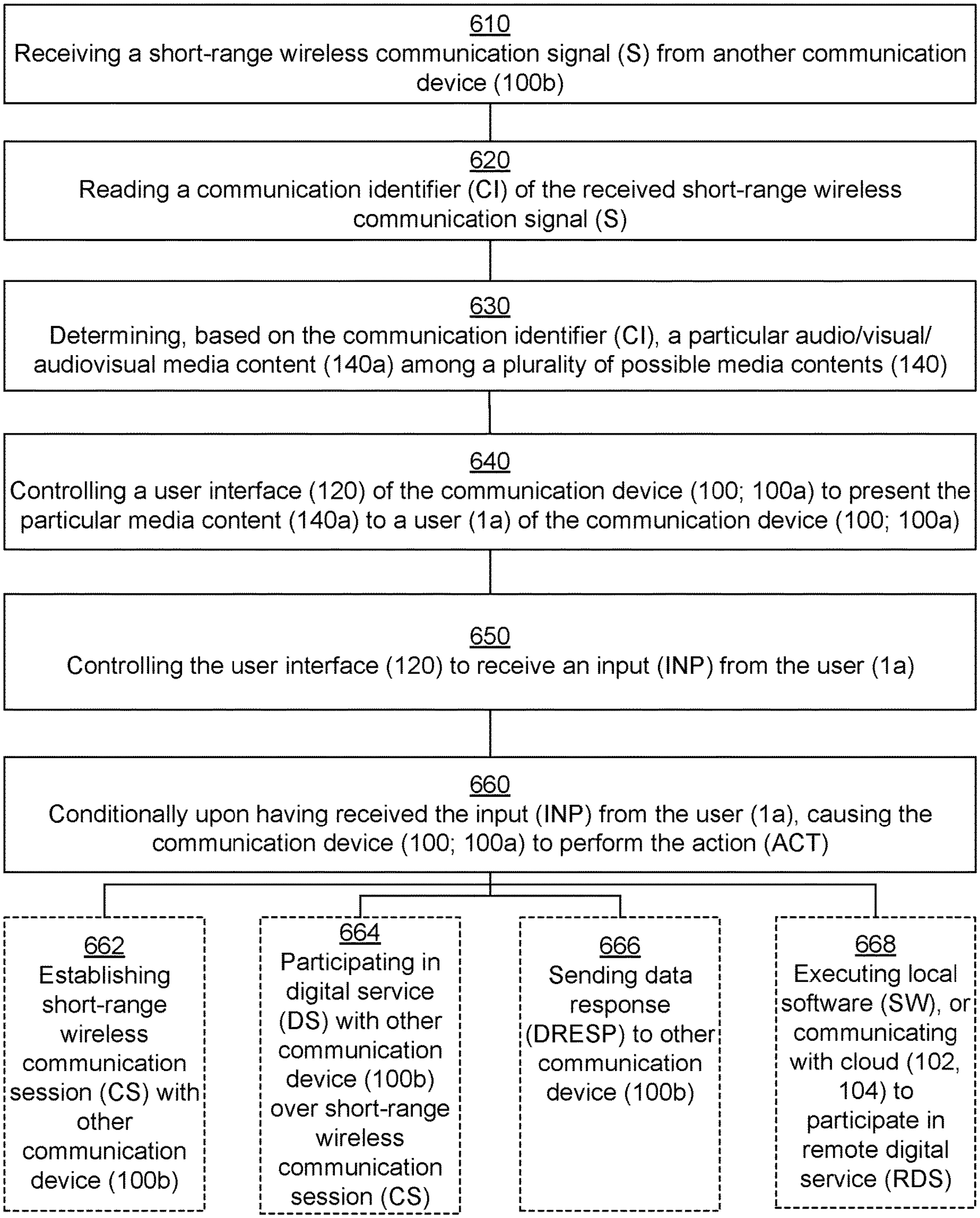
FIG. 6 is a schematic flowchart diagram of a method according to embodiments of the present invention.

The processing device 110 is configured for reading a communication identifier CI of the received short-range wireless communication signal S (step 620, FIG. 6). As will be explained in more detail with reference to the disclosed embodiments, the communication identifier CI of the received short-range wireless communication signal S may, for instance, be a communication address that represents the other communication device 100*b*, such as a MAC address, a Bluetooth address, an IP address, or any temporary address data representing such an address. Other examples of the communication identifier CI include a service indicator that indicates one of a plurality of communication services supported by a communication protocol that the received short-range wireless communication signal S complies with, a channel indicator that indicates one of a plurality of communication channels supported by a communication protocol that the received short-range wireless communication signal S complies with, a session key or other key data that represents a communication session being established between the communication device 100; 100*a* and the other communication device (100*b*), or a session key or other key data being used for encrypted data communication between the communication device 100; 100*a* and the other communication device 100*b*.

Figure 7:
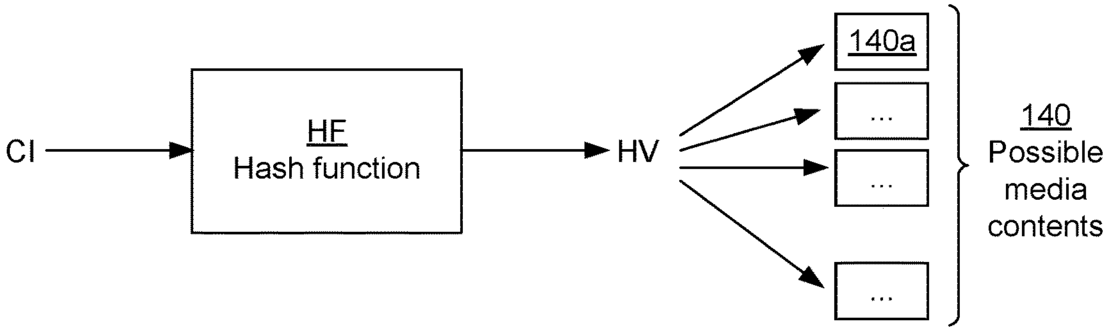
FIG. 7 illustrates a mechanism for determining the particular audio/visual/audiovisual media content among the plurality of possible media representations according to one embodiment of the present invention.
Figure 8:
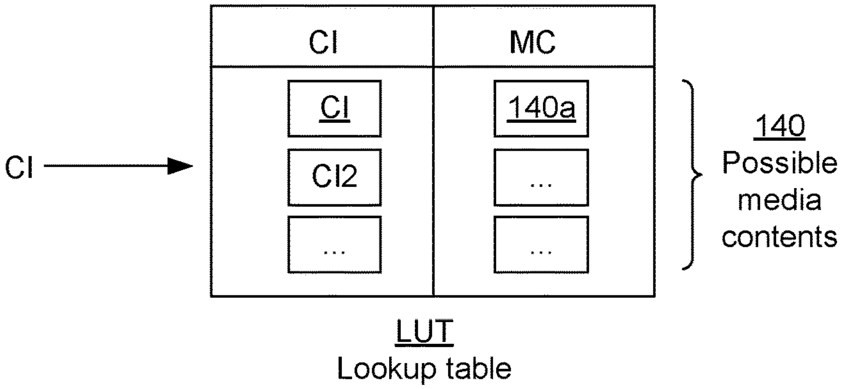
FIG. 8 illustrates a mechanism for determining the particular audio/visual/audiovisual media content among the plurality of possible media representations according to another embodiment of the present invention.

The processing device 110 is moreover configured for determining-based on the communication identifier CI-a particular audio/visual/audiovisual media content 140*a* among a plurality of possible media contents 140 (step 630, FIG. 6). The determining, by the processing device 110, of the particular audio/visual/audiovisual media content 140*a* among the plurality of possible media representations 140 occurs locally in the communication device 100; 100*a* using the communication identifier CI, or a part thereof, as a reference by means of which the particular audio/visual/-audiovisual media content 140*a* can be identified, chosen or generated locally in the communication device 100; 100*a*. Some beneficial mechanisms for performing the determining of the particular audio/visual/audiovisual media content 140*a* are illustrated in FIGS. 7 and 8 and will be described in more detail later.

The processing device 110 is further configured for controlling the user interface 120 to present the particular media content 140*a* to the user 1*a* of the communication device 100; 100*a* (step 640, FIG. 6). The processing device 110 is then configured for controlling the user interface 120 to receive an input INP from the user 1*a* (step 650, FIG. 6).

Finally, the processing device 110 is configured for causing the communication device 100; 100*a* to perform an action ACT (step 660, FIG. 6). This step is performed conditionally upon having received the input INP from the user 1*a*, i.e. the action ACT is not performed unless the input INP has been received from the user 1*a*.

As can be seen in FIG. 1, the processing device 110 is advantageously configured for controlling the user interface 120 to receive the input INP as an inspection result of the user's 1*a* verification of a match between the presented particular media content 140*a* and a corresponding particular media content 140*b* being presented by or at the other communication device 100*b*. This will mean that also the corresponding particular media content 140*b* has been determined from or is otherwise based on the same communication identifier CI. The particular media content 140*a* and the corresponding particular media content 140*b* should therefore be identical (subject to slight differences in the manner in which they are presented). In some embodiments, the corresponding particular media content 140*b* is presented in or by a presentation device of the other communication device 100*b*. In embodiments where the communication identifier CI remains static (i.e., does not have to be changeable by the other communication device 100*b*), the corresponding particular media content 140*b* may alternatively be presented by a presentation device which is not operatively connected with the other communication device 100*b*, or even as a static sign, poster, sticker, etc.

As was explained already in the summary section, the present invention will facilitate for the user 1*a* of the communication device 100; 100*a* to verify that the action ACT will be performed in a controlled manner. In the situation shown in FIG. 1, the user 1*a* may benefit from being able to verify that the action ACT is performed with respect to the correct entity, i.e. the other communication device 100*b*, and not with another entity by mistake or confusion.

To facilitate further for the user 1*a*, the plurality of possible media contents 140 represents a finite group of different media contents 140. Each individual media content in the finite group of different media contents 140 is such that, upon being presented as the aforementioned particular media content 140*a* in the user interface 120 of the communication device 100; 100*a*, the individual media content is distinctly discernible from all other media contents 140 in the finite group of different media contents 140 by the user 1*a* of the communication device 100; 100*a*. At the same time, this represent an approach that can be efficiently implemented in the communication device 100; 100*a* in terms of usage of computational and memory resources.

The plurality of possible media contents 140 may advantageously be differentiated by different colors. Hence, the particular media content 140*a* may be presented in the user interface 120 as a display screen background, or an object shown as a display screen foreground, being of a certain color among these different possible colors (and similarly for the corresponding particular media content 140*b* by or at the other device 100*b*). Alternatively, the plurality of possible media contents 140 may advantageously be differentiated by different sounds, wherein the particular media content 140*a* may be presented in the user interface 120 as a certain sound among these different possible sounds (and similarly for the corresponding particular media content 140*b* by or at the other device 100*b*). Differentiation by combinations of colors and sounds is also conceivable.

In an advantageous embodiment, the plurality of possible media contents 140 represents different graphical objects, wherein each graphical object is composed of a combination of a limited number of differently sized and/or oriented blocks that are easily discernable by the user 1*a* also from some distance (cf. the presentation of the corresponding particular media content 140*b* by or at the other device 100). This is advantageous also for reasons of implementation efficiency. Only a few number of bits will have to be used to represent the particular combination. Similarly, the plurality of possible media contents 140*b* may represent different symbols, or sets of different symbols, again being easily discernable by the user 1*a* also from some distance and having an advantage in terms of implementation efficiency.

The communication device 100; 100*a* may, for instance, be a mobile communication device, a mobile phone, a smart phone, a tablet computer, a personal digital assistant, a portable computer, smart glasses, a smart watch, or a smart bracelet. The other communication device may be a similar device, or alternatively a service terminal such as for instance a point-of-sales terminal, a cash register, a part of a cash register or a communication device operatively coupled thereto.

Figure 2:
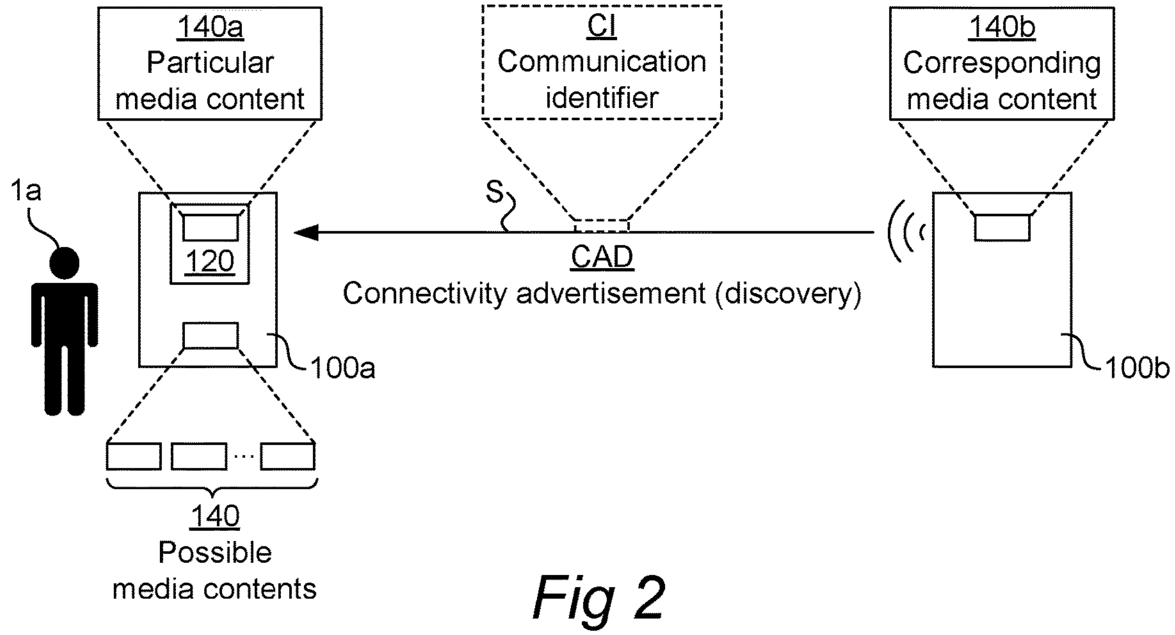
FIGS. 2 and 3 are general illustrations of a first class of embodiments of the present invention.
Figure 3:
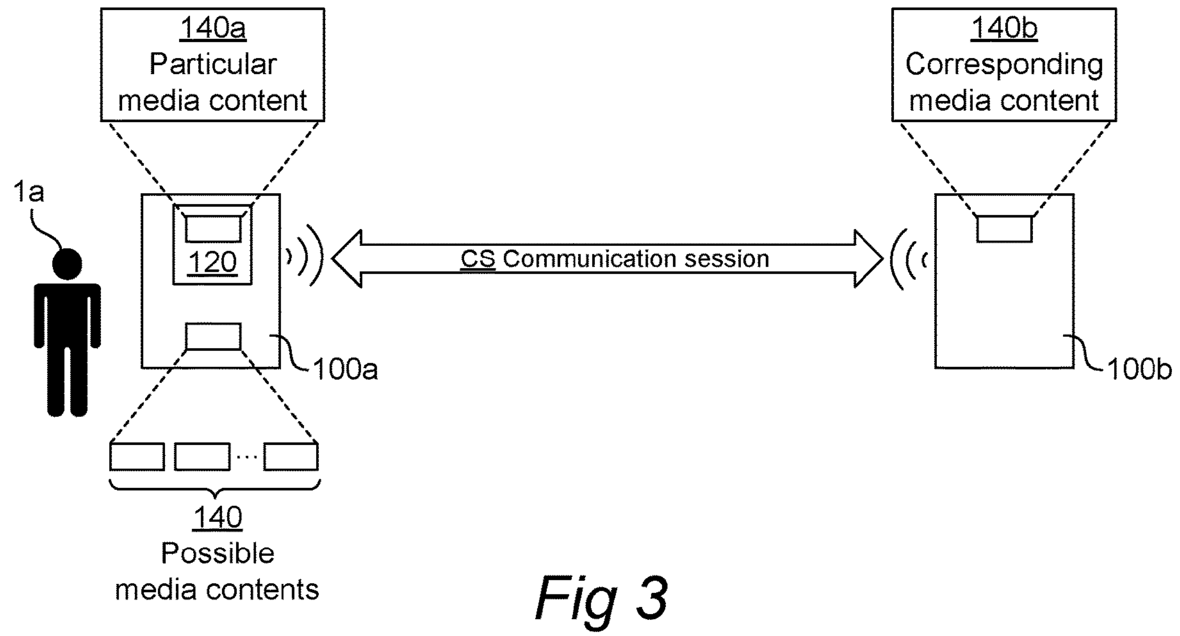

A first class of embodiments of the present invention will now be described with reference to FIGS. 2 and 3. The first class of embodiments operates during connectivity advertisement or discovery (CAD), i.e. when the received signal S is transmitted by the other communication device 100*b* to announce its availability for short-range wireless communication which has not yet been established between the devices 100*a*, 100*b*.

To this end, the short-range wireless communication transceiver 130 of the communication device 100; 100*a* is configured for receiving the short-range wireless communication signal S as a signal transmitted during connectivity advertisement or discovery (CAD). See FIG. 2. Upon successful verification by the user 1*a* of a match between the presented particular media content 140*a* (determined based on the read communication identifier CI of the received signal S, as previously explained), the communication device 100; 100*a* will receive the input INP. Accordingly, the processing device 110 is configured for causing the communication device 100; 100*a* to perform the action ACT by causing the short-range wireless communication transceiver 130 to establish a short-range wireless communication session CS with the other communication device 100*b*. This can be seen in FIG. 3, and also at step 662 in FIG. 6. Thanks to this embodiment of the present invention, the user 1*a* is given an ability to verify and control what device he or she establishes the communication session CS with, which is advantageous for personal or data integrity reasons, for instance.

Figure 4A:
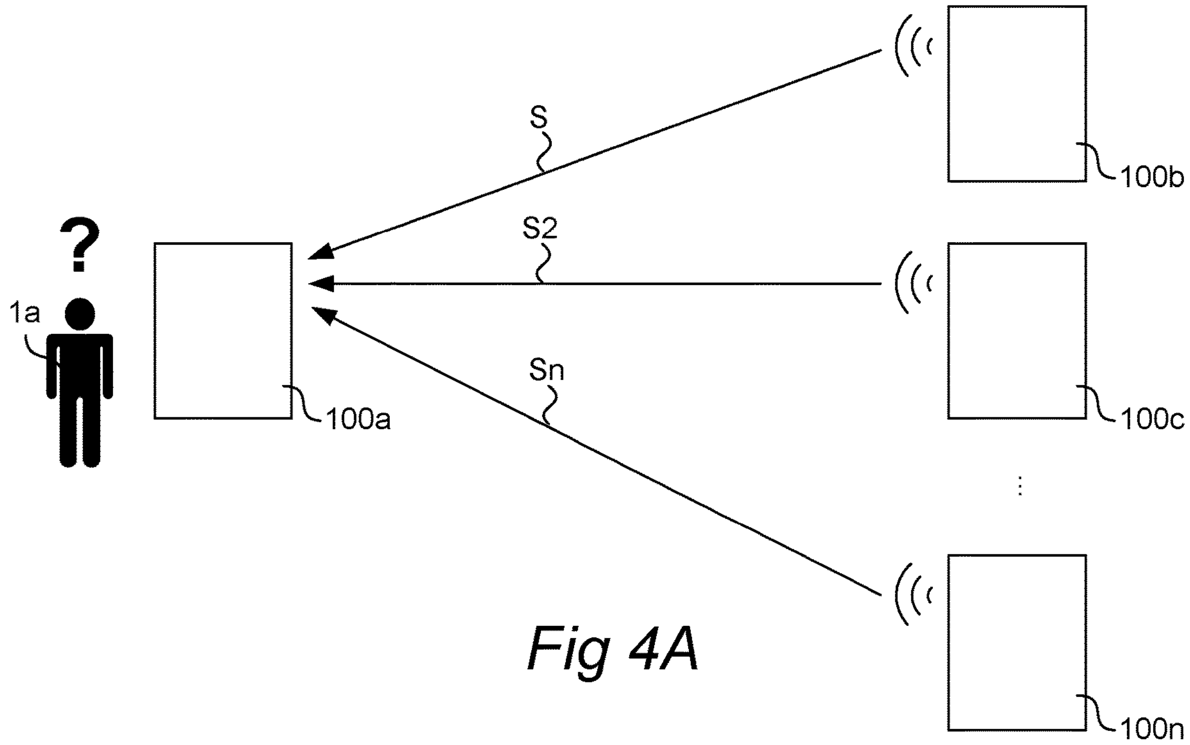
FIGS. 4A to 4C illustrate a special case of the first class of embodiments.
Figure 4B:
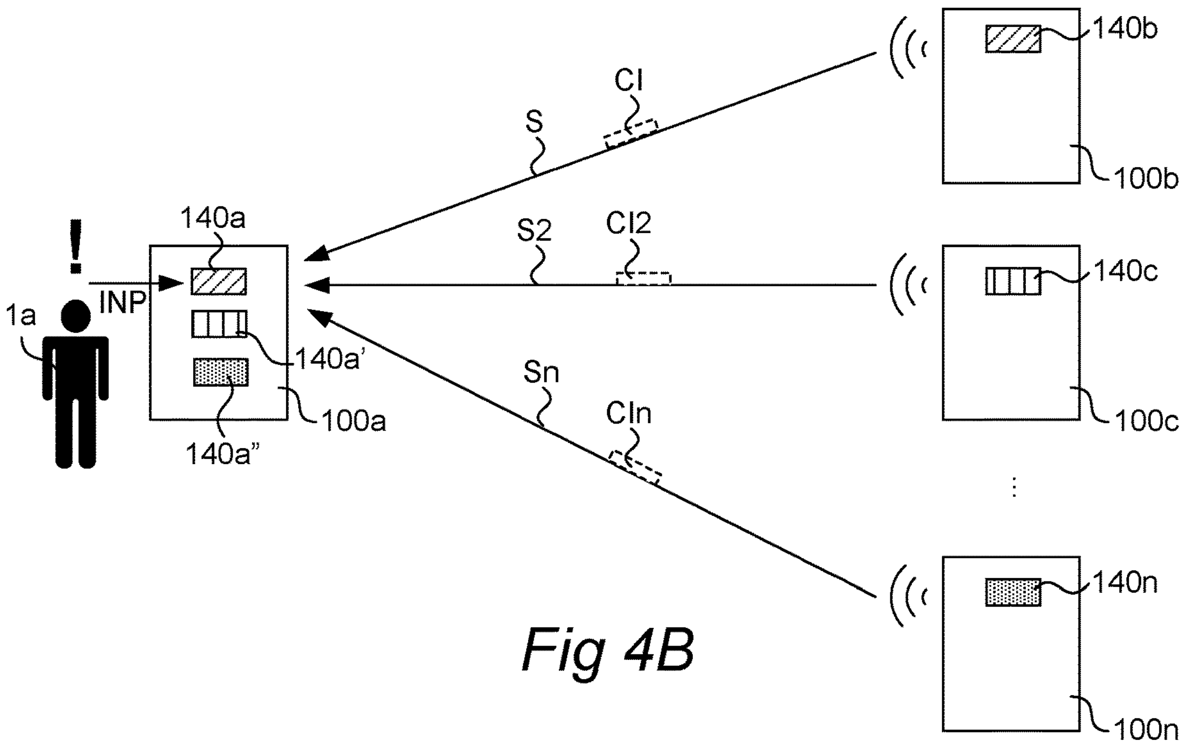
Figure 4C:
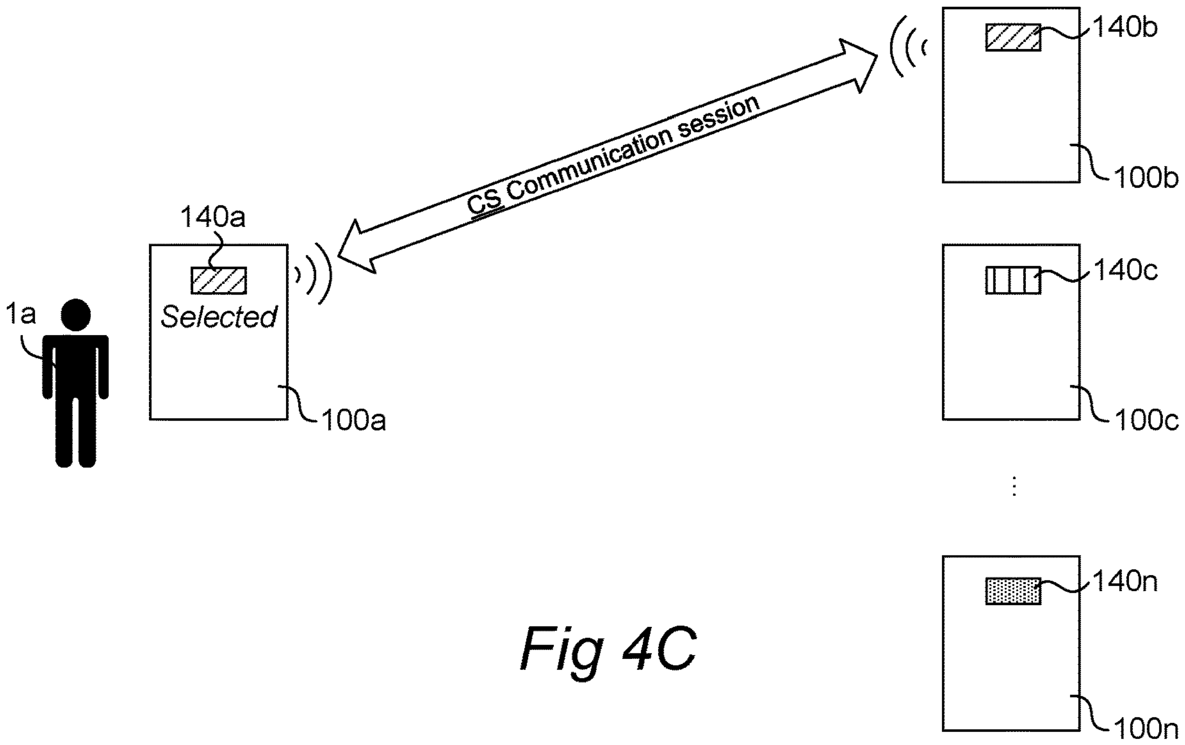

A special case of the first class of embodiments is illustrated in FIGS. 4A to 4C. Here, the situation is as follows. As seen in FIG. 4A, the user 1*a* has brought the communication device 100*a* to a location where there are apparently several other communication devices 100*b*, 100*c*, . . . , 100*n* reachable by short-range wireless communication. The communication devices 100*b*, 100*c*, . . . , 100*n* may for instance be service terminals in the form of point-of-sales terminals in a checkout area of a shop, or ticket machines, vending machines, etc.

As can be seen in FIG. 4A, the communication device 100*a* receives short-range wireless communication signals S, S2, . . . , Sn from the different other communication devices 100*b*, 100*c*, . . . , 100*n* within range, but the user 1*a* is at loss about what received signal correlates to what other device.

The present invention solves the situation for the user 1*a* in the follow way, as can be seen in FIG. 4B. In addition to being configured in the way that was described with reference to FIGS. 1-3, the short-range wireless communication transceiver 130 of the communication device 100; 100*a* is further configured for receiving a second short-range wireless communication signal S2 from a second other communication device 100*c* (and likewise for additional other short-range wireless communication signals Sn from additional other communication devices 100*n*). The received short-range wireless communication signal S and the second, third, etc., short-range wireless communication signal S2 . . . . Sn are, as previously explained, transmitted during connectivity advertisement or discovery (CAD).

The processing device 110 is further configured for reading a second, third, etc., communication identifier CI2 . . . . CIn of the received second, third, etc., short-range wireless communication signal S2 . . . . Sn. The processing device 110 is moreover configured for determining, based on the second, third, etc., communication identifier CI2 . . . . CIn, a second, third, etc., particular audio/visual/audiovisual media content 140*a*'-140*a*" among the plurality of possible media contents 140. The processing device 110 is then configured for controlling the user interface 120 to present the other communication device 100*b* and the second, third, etc., other communication device 100*c* . . . 100*n* as alternatives for selection, represented by the particular media content 140*a* and the second, third, etc., particular media content 140*a*'-140*a*", respectively.

The processing device 110 is further configured for controlling the user interface 120 to receive the input INP as the user's 1*a* selection of one of the other communication device 100*b* and the second, third, etc., other communication device 100*c* . . . 100*n*. This can be seen in FIG. 4B.

The processing device 110 is finally configured for causing the communication device 100; 100*a* to perform the action ACT by causing the short-range wireless communication transceiver 130 to establish a short-range wireless communication session CS with the selected other communication device 100*b* or second, third, etc., other communication device 100*c* . . . 100*n*, as indicated by the input INP from the user 1*a*. In the exemplary situation seen in FIGS. 4B and 4C, the user 1*a* selects the other communication device 100*b* (as represented by the particular media content 140*a*), and hence the short-range wireless communication session CS is established with the other communication device 100*b* but not with the second, third, etc., other communication device 100*c* . . . 100*n*.

Figure 10A:
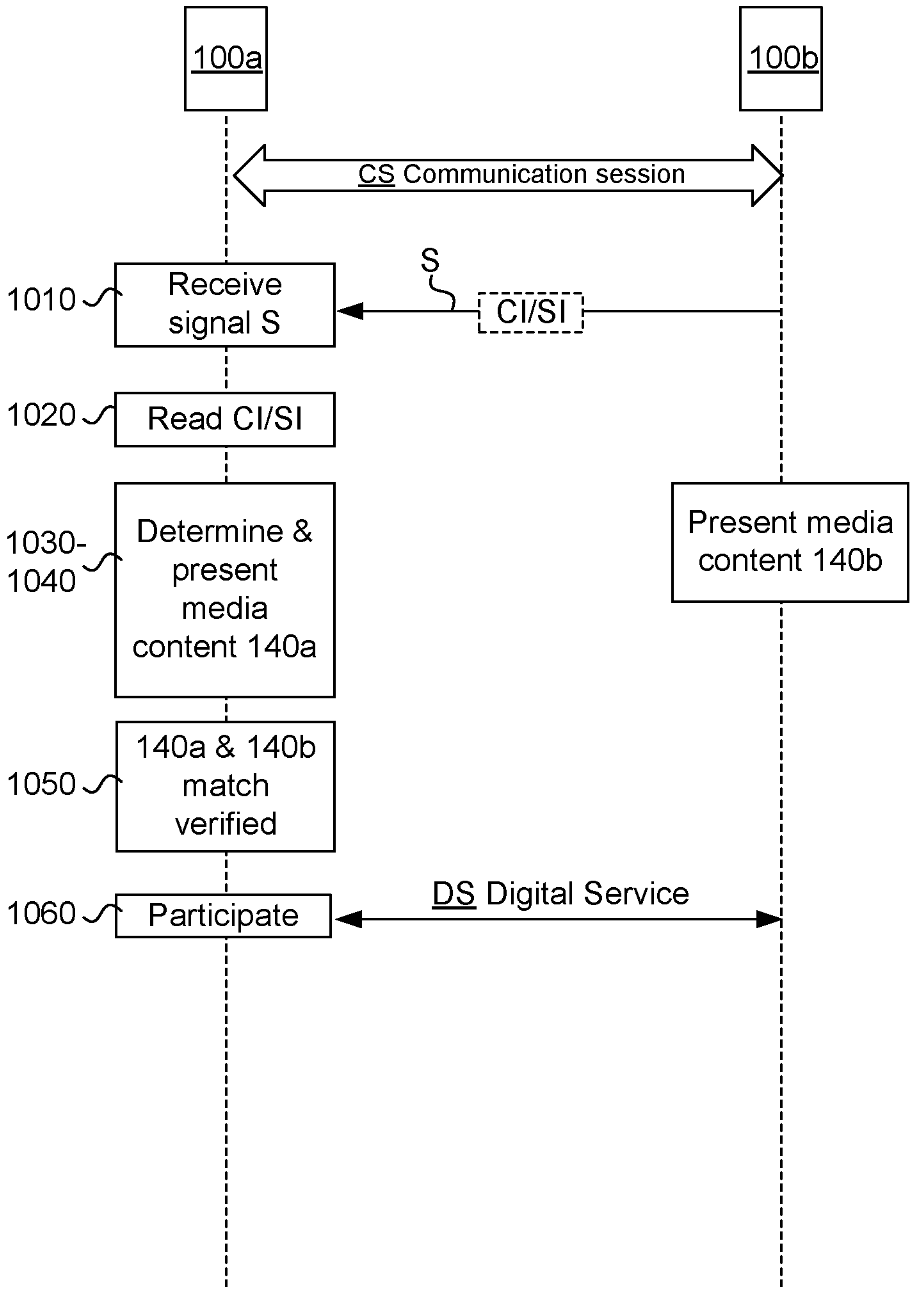
FIGS. 10A and 10B are general illustrations of a second class of embodiments of the present invention.
Figure 10B:
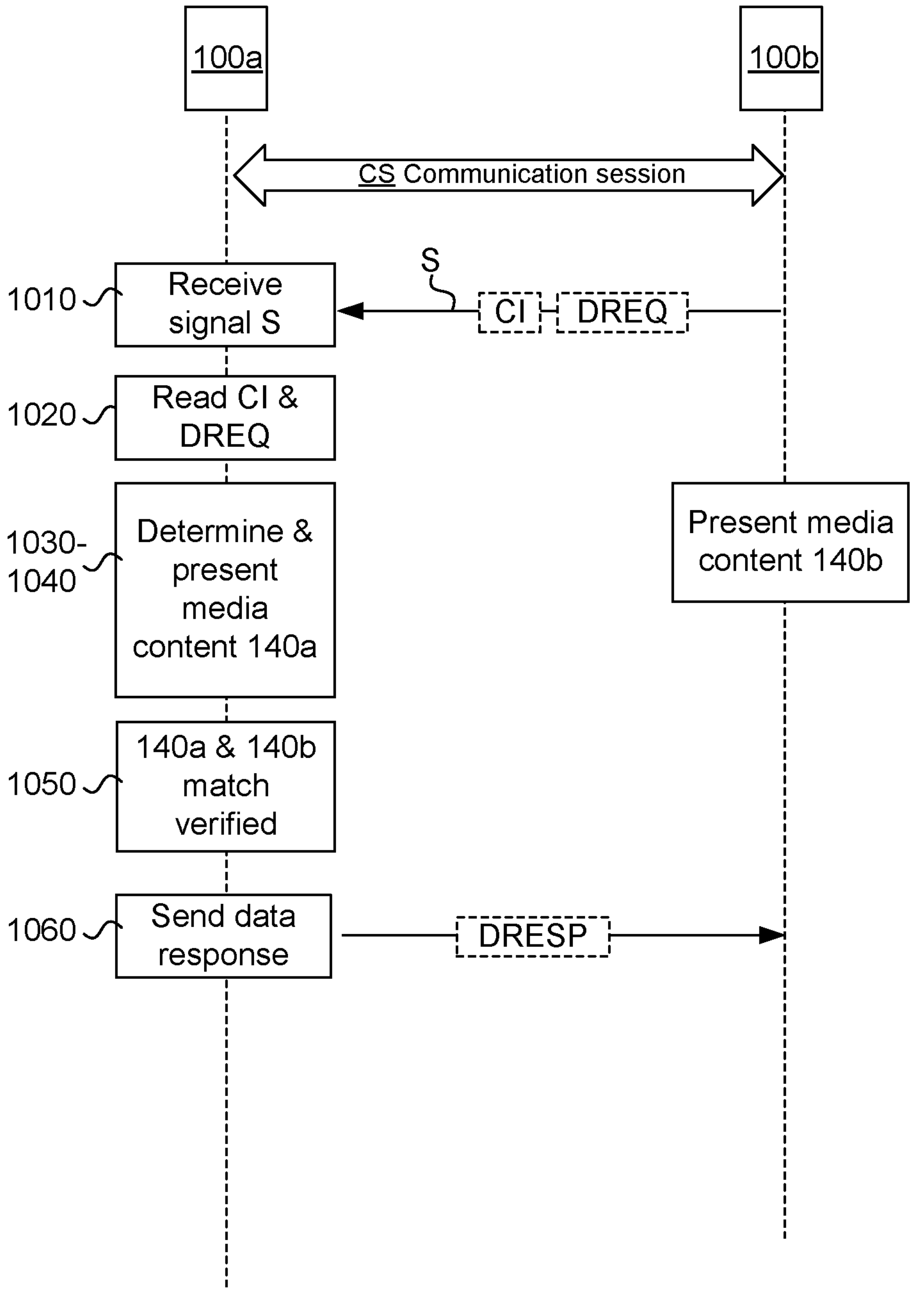

FIGS. 10A and 10B are general illustrations of a second class of embodiments of the present invention which is different from the first class of embodiments in that there is already an existing short-range wireless communication session CS between the communication device 100*a* and the other communication device 100*b*. Thus, in FIG. 10A, there is already an existing communication session CS between the communication devices 100*a* and 100*b* when the device 100*b* transmits the communication signal S as data traffic to the device 100*a*.

To this end, the short-range wireless communication transceiver 130 of the communication device 100 is configured for receiving the short-range wireless communication signal S as data traffic over the established short-range wireless communication session CS with the other communication device 100*b*. The data traffic comprises a service invitation SI from the other communication device 100*b*. The service invitation SI indicates a digital service DS offered by the other communication device 100*b* over the short-range wireless communication session CS. In some embodiments, the communication identifier CI and the service invitation SI of the communication signal S may be the same data, in other embodiments they may be separate data.

As is seen in FIG. 10A, the communication device 100 performs steps 1010-1050 that are the same or essentially corresponds to the steps 610-650 in the method described above for FIG. 6.

Once the verifying input INP has been provided by the user 1*a*, the processing device 110 of the communication device 100 is then configured for causing the communication device 100; 100*a* to perform the action ACT by participating in the digital service DS (as indicated by the service invitation SI) with the other communication device 100*b* over the short-range wireless communication session CS. This can be seen at step 1060 in FIG. 10A. Also see step 664 in FIG. 6. The digital service DS may, for instance, involve a payment transaction, a transaction for transfer of funds, an information exchange, an identity authentication, or an access authorization. This embodiment will hence allow the user 1*a* to verify his or her participation in the digital service DS as offered by the other communication device 100*b*.

The embodiment in FIG. 10B is similar, with the following differences. The other communication device 100*b* sends a data request DREQ in the short-range wireless communication signal S to the communication device 100*a*, requesting the communication device 100*a* to respond with a data response DRESP. To give the user 1*a* an ability to control the making of this data response, the functionality 1010-1050 is performed in the same or very similar way as in FIG. 10A. The response in step 1060 is made only once the user has given the verifying input INP, as previously described.

To summarize the embodiment of FIG. 10B, the short-range wireless communication transceiver 130 of the communication device 100*a* is configured for receiving the short-range wireless communication signal S as data traffic over an established short-range wireless communication session CS with the other communication device 100*b*. The data traffic comprises a data request DREQ from the other communication device 100*b*. The processing device 110 of the communication device 100*a* is configured for causing the communication device 100*a* to perform the action ACT by causing the short-range wireless communication transceiver 130 to send a data response DRESP to the other communication device 100*b*. Also see step 668 in FIG. 6.

Figure 11A:
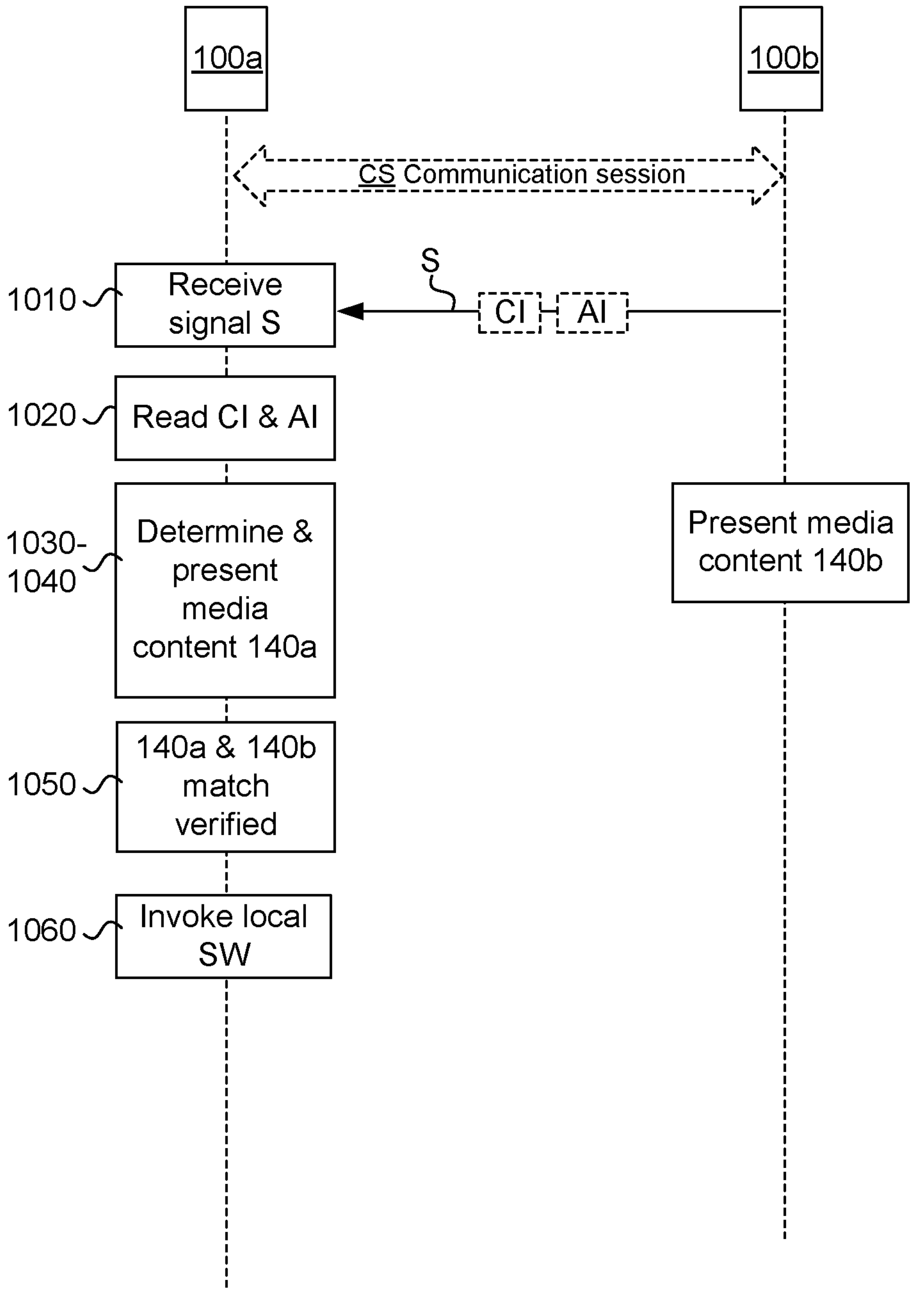
FIGS. 11A and 11B are general illustrations of alternative embodiments of the present invention.

FIG. 11A illustrates an alternative embodiment of the present invention, applicable both to the situation of the first class of embodiments (the communication signal S being sent during connectivity advertisement or discovery (CAD)) and the situation of the second class of embodiments (the communication signal S being sent as data traffic over an existing short-range wireless communication session CS).

In this embodiment, the processing device 110 of the communication device 100*a* is configured for causing the communication device 100*a* to perform the action ACT in step 1060 by invoking or executing software or firmware instructions SW that are stored locally in the communication device 100, typically in the memory 150 (see FIG. 5). Also see step 668 in FIG. 6. This embodiment allows the user 1*a* to verify the performance of an action ACT which is triggered by the short-range wireless communication signal S from the other communication device 100*b*, but which does not necessarily result in responsive communication with this other device 100*b*. Instead, the action ACT may exclusively be performed locally in and by the communication device 100*a*. The action to be performed (controlled by the user 1*a* thanks to the inventive functionality) may be indicated by the other communication device 100*b* by including an action identifier AI in the communication signal S, as can be seen in FIG. 11A. Hence, the functionality of the embodiment of FIG. 11A is that of an action being proposed by the other communication device 100*b* but being performed locally in and by the communication device 100, under the control of the user 1*a*.

Figure 11B:
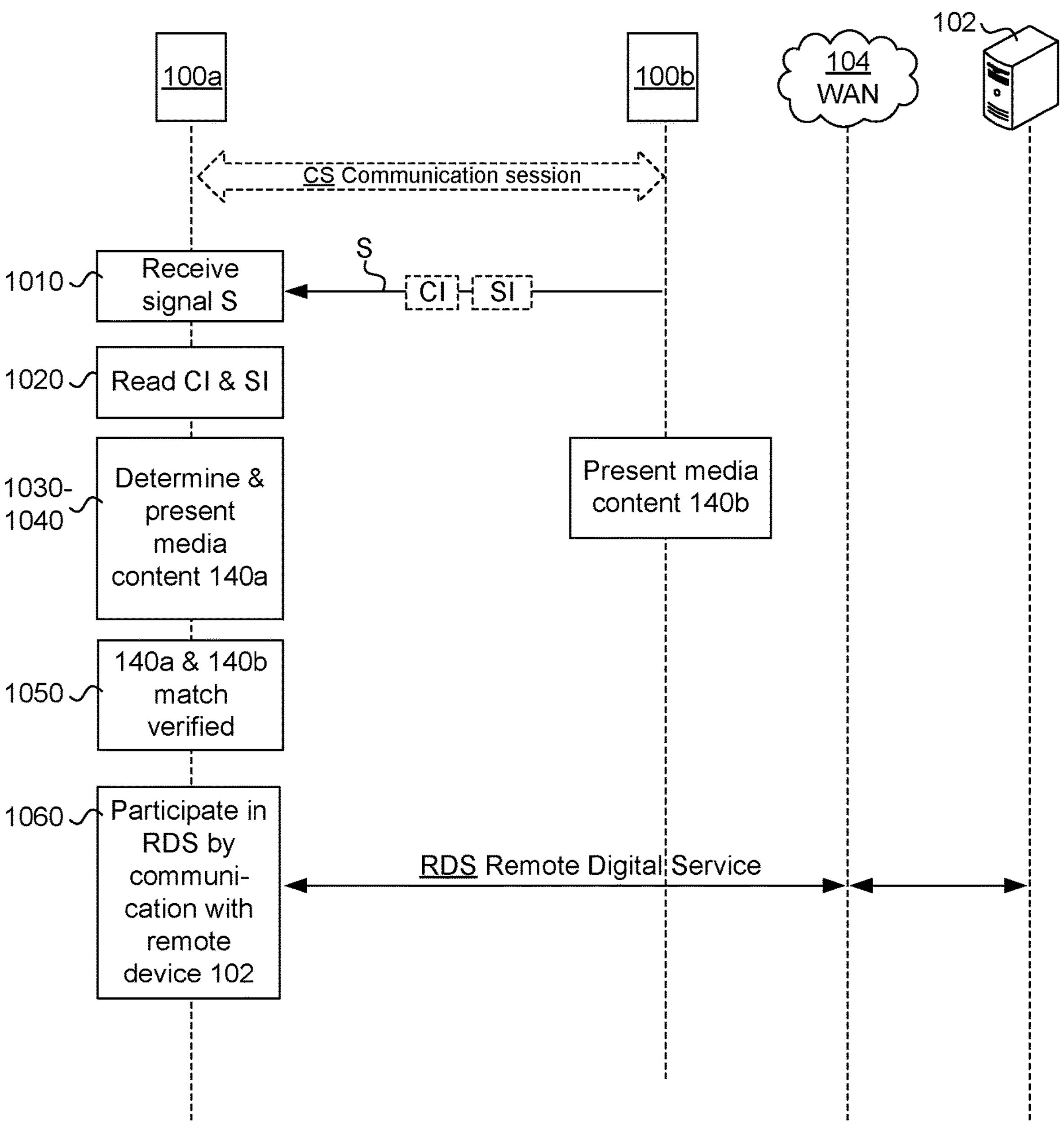

An alternative to the embodiment of FIG. 11A is illustrated in FIG. 11B. In this embodiment, the communication device 100; 100*a* further comprises a long-range communication interface 132 for broadband communication, as can be seen in FIG. 5. This will enable the communication device 100; 100*a* to communicate with a remote communication device 102 via a wide area communication network being compliant with, for instance, one or more of W-CDMA, GSM, UTRAN, HSPA, LTE, LTE Advanced, and TCP/IP, and/or via a WLAN access point. In this embodiment, therefore, the processing device 110 of the communication device 100; 100*a* is configured in step 1060 for causing the communication device 100; 100*a* to perform the action ACT by causing the long-range communication interface 132 to communicate with the remote communication device 102. Also see step 668 in FIG. 6. Advantageously, the performed action ACT, and hence the remote communication in step 1060, is part of a remote digital service RDS that is provided by the remote communication device 102 via the WAN 104, The remote digital service RDS may typically involve a cloud-based or cloud-assisted payment transaction, transaction for transfer of funds, information exchange, identity authentication, or access authorization.

It is recalled that in step 630 of FIG. 6, the determining, by the processing device 110, of the particular audio/visual/audiovisual media content 140*a* among the plurality of possible media representations 140 occurs locally in the communication device 100; 100*a* using the communication identifier CI, or a part thereof, as a reference by means of which the particular audio/visual/audiovisual media content 140*a* can be identified, chosen or generated locally in the communication device 100; 100*a*. Some beneficial mechanisms for performing this determination of the particular audio/visual/-audiovisual media content 140*a* are illustrated in FIGS. 7 and 8 and will be described in more detail later.

FIG. 7 illustrates one embodiment 700 of a mechanism for determining the particular audio/visual/audiovisual media content 140*a* among the plurality of possible media representations 140 according to any of the embodiments described above.

In the embodiment of FIG. 7, the processing device 110 of the communication device 100; 100*a* is configured for determining, based on the communication identifier CI, the particular audio/visual/audiovisual media content 140*a* among the plurality of possible media representations 140 by the following measures.

A hash value HV is calculated by inputting the communication identifier CI that has been read in step 610 of FIG. 6, or a part of the communication identifier CI, to a hash function HF. The calculated hash value HV, or a part thereof, is then used to identify, choose or generate the particular audio/visual/audiovisual media content 140*a* among the plurality of possible media contents 140. For instance, n bits of the calculated hash value HV may be used as a selector or identifier of a particular media content 140*a* among $2^n$ possible media contents 140.

In one variant, the information from the calculated hash value HV is used to select or identify a color value in a color space as the particular media content 140*a*. Hence, the information from the calculated hash value HV in effect generates the particular media content 140*a* since it directly gives the color value thereof. This is believed to represent a particularly efficient implementation which requires only a minimum of resources to be implemented in the communication device 100; 100*a*. It is also particularly efficient since the plurality of possible media contents 140 need not exist as physical entities and occupy storage space, because the particular media content is generated on the fly from the information from the calculated hash value HV.

In other variants, the information from the calculated hash value HV may be used as an identifier or pointer that indicates the particular media content 140*a* among the plurality of possible media contents 140, which in that case may be stored, for instance, in the local memory 150 (as seen in FIG. 5).

Hence, the communication identifier CI, or a part thereof, is used locally in and by the communication device 100; 100*a* as a reference by means of which, through the calculated hash value HV, the particular audio/visual/audiovisual media content 140*a* can be identified, chosen or generated locally in the communication device 100; 100*a*.

FIG. 8 illustrates another embodiment 800 of a mechanism for determining the particular audio/visual/audiovisual media content 140*a* among the plurality of possible media representations 140 according to any of the embodiments described above.

In the embodiment of FIG. 8, the processing device 110 of the communication device 100; 100*a* is configured for determining, based on the communication identifier CI, the particular audio/visual/audiovisual media content 140*a* among the plurality of possible media representations 140 by the following measures.

A look-up table LUT is searched by using the communication identifier CI, or a part thereof, as index. The look-up table LUT may be stored, for instance, in the local memory 150 (as seen in FIG. 5). A matching entry in the look-up table LUT is located.

The located matching entry is then used to identify, choose or retrieve the particular audio/visual/audiovisual media content 140*a* among the plurality of possible media contents 140. In one variant (shown in FIG. 8), the plurality of possible media contents 140 are stored directly in the lookup table LUT. In other variants, the lookup table LUT may store identifiers or pointers to the plurality of possible media contents 140, which are then as such stored outside the lookup table LUT (but may very well be stored in the memory 150, i.e. still locally in the communication device 100; 100*a*).

Hence, the communication identifier CI, or a part thereof, is used locally in and by the communication device 100; 100*a* as a reference by means of which, through the located matching entry in the look-up table LUT, the particular audio/visual/audiovisual media content 140*a* can be identified, chosen or generated locally in the communication device 100.

The processing device 110 of the communication device 100; 100*a* may be implemented in any known controller technology, including but not limited to microcontroller, processor (e.g. PLC, CPU, DSP), FPGA, ASIC or any other suitable digital and/or analog circuitry capable of performing the intended functionality.

The memory 150 of the communication device 100; 100*a* may be implemented in any known memory technology, including but not limited to ROM, RAM, SRAM, DRAM, CMOS, FLASH, DDR, SDRAM or some other memory technology. In some embodiments, the memory or parts thereof may be integrated with or internal to the processing device 110. The memory may store program instruction for execution by the processing device 110 (also see the description of FIG. 9 below), as well as temporary and permanent data for use by the processing device 110.

The short-range wireless communication transceiver 130 may, for instance, be compliant with Bluetooth, BLE (Bluetooth Low Energy), RFID, WLAN, WiFi, mesh communication, or another form of proximity-based device-to-device radio communication such as LTE Direct.

Figure 9:
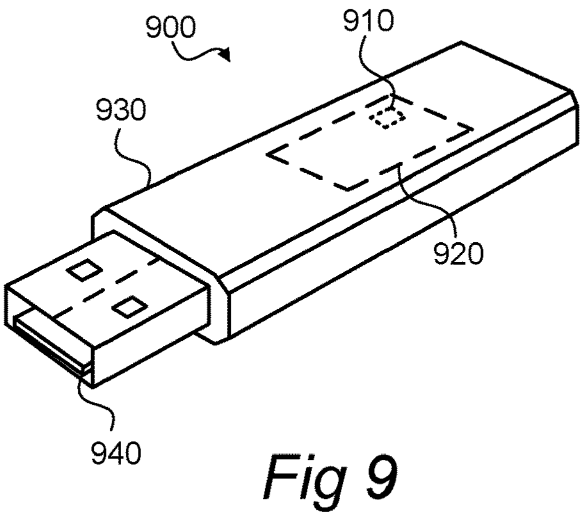
FIG. 9 is a schematic illustration of a computer-readable medium in one exemplary embodiment, capable of storing a computer program product.

FIG. 9 is a schematic illustration of a computer-readable medium 900 in one exemplary embodiment, capable of storing a computer program product 910. The computer-readable medium 900 in the disclosed embodiment is a memory stick, such as a Universal Serial Bus (USB) stick; the computer-readable medium 900 may however be embodied in various other ways instead, as is well-known per se to the skilled person. The USB stick 900 comprises a housing 930 having an interface, such as a connector 940, and a memory chip 920. In the disclosed embodiment, the memory chip 920 is a flash memory, i.e. a non-volatile data storage that can be electrically erased and re-programmed. The memory chip 920 stores the computer program product 910 which is programmed with computer program code (instructions) that when loaded into a processing device, such as a CPU, will perform a method 600 according to any or all of the embodiments disclosed above. The processing device may, for instance, be the aforementioned processing device 110. The USB stick 900 is arranged to be connected to and read by a reading device for loading the instructions into the processing device. It should be noted that a computer-readable medium can also be other mediums such as compact discs, digital video discs, hard drives or other memory technologies commonly used. The computer program code (instructions) can also be downloaded from the computer-readable medium via a wireless interface to be loaded into the processing device.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A communication device comprising:
a processing device;
a user interface; and
a short-range wireless communication transceiver,
wherein the short-range wireless communication transceiver is configured for:
receiving a short-range wireless communication signal from another communication device, and
wherein the processing device is configured for:
reading a communication identifier of the received short-range wireless communication signal;
determining, based on the communication identifier, a particular audio/visual/audiovisual media content among a plurality of possible media contents, wherein said determining occurs locally in the communication device using the communication identifier, or a part thereof, as a reference by means of which the particular audio/visual/audiovisual media content can be identified, chosen or generated locally in the communication device;
controlling the user interface to present the particular media content to a user of the communication device;
controlling the user interface to receive an input from the user as an inspection result of the user's verification of a match between the presented particular media content and a corresponding particular media content being presented by or at the other communication device; and
conditionally upon having received the input from the user, causing the communication device to perform an action.

2. The communication device as defined in claim 1, wherein the plurality of possible media contents represents a finite group of different media contents, each individual media content in the finite group of different media contents being such that, upon being presented as said particular media content in the user interface of the communication device, said individual media content is distinctly discernible from all other media contents in the finite group of different media contents by the user of the communication device.

3. The communication device as defined in claim 1,
wherein the short-range wireless communication transceiver is configured for receiving the short-range wireless communication signal as a signal transmitted during connectivity advertisement or discovery, and
wherein the processing device is configured for causing the communication device to perform the action by causing the short-range wireless communication transceiver to establish a short-range wireless communication session with the other communication device.

4. The communication device as defined in claim 1,
wherein the short-range wireless communication transceiver is further configured for receiving a second short-range wireless communication signal from a second other communication device, the received short-range wireless communication signal and second short-range wireless communication signal being transmitted during connectivity advertisement or discovery, and
wherein the processing device is configured for:
reading a second communication identifier of the received second short-range wireless communication signal;
determining, based on the second communication identifier, a second particular audio/visual/audiovisual media content among the plurality of possible media contents;
controlling the user interface to present the other communication device and the second other communication device as alternatives for selection, represented by the particular media content and the second particular media content, respectively;
controlling the user interface to receive the input as the user's selection of either of the other communication device and the second other communication device; and
causing the communication device to perform the action by causing the short-range wireless communication transceiver to establish a short-range wireless communication session with the selected other communication device or second other communication device, as indicated by the input from the user.

5. The communication device as defined in claim 1, wherein the short-range wireless communication transceiver is configured for receiving the short-range wireless communication signal as data traffic over an established short-range wireless communication session with the other communication device, the data traffic comprising a service invitation from the other communication device; and
wherein the processing device is configured for causing the communication device to perform the action by participating in a digital service with the other communication device over the short-range wireless communication session.

6. The communication device as defined in claim 5, wherein the digital service involves one of the following:
a payment transaction;
a transaction for transfer of funds;
an information exchange;
an identity authentication; and
an access authorization.

7. The communication device as defined in claim 1, wherein the short-range wireless communication transceiver is configured for receiving the short-range wireless communication signal as data traffic over an established short-range wireless communication session with the other communication device, the data traffic comprising a data request from the other communication device; and
wherein the processing device is configured for causing the communication device to perform the action by causing the short-range wireless communication transceiver to send a data response to the other communication device.

8. The communication device as defined in claim 1,
wherein the processing device is configured for causing the communication device to perform the action by invoking or executing software or firmware instructions stored locally in the communication device.

9. The communication device as defined in claim 1, further comprising a long-range communication interface for broadband communication,
wherein the processing device is configured for causing the communication device to perform the action by causing the long-range communication interface to communicate with a remote communication device.

10. The communication device as defined in claim 9, wherein the performed action is part of a remote digital service that is provided by the remote communication device and involves one of the following:
a payment transaction;
a transaction for transfer of funds;

an information exchange;
an identity authentication; and
an access authorization.

11. The communication device as defined in claim 1, wherein the processing device is configured for determining, based on the communication identifier, the particular audio/visual/audiovisual media content among the plurality of possible media representations contents by:
calculating a hash value by inputting the communication identifier, or a part thereof, to a hash function; and
using the calculated hash value, or a part thereof, to identify, choose or generate the particular audio/visual/audiovisual media content among the plurality of possible media contents.

12. The communication device as defined in claim 1, wherein the processing device is configured for determining, based on the communication identifier, the particular audio/visual/audiovisual media content among the plurality of possible media representations contents by:
searching a look-up table by using the communication identifier, or a part thereof, as index;
locating a matching entry in the look-up table; and
using the located matching entry to identify, choose or retrieve the particular audio/visual/audiovisual media content among the plurality of possible media contents.

13. The communication device as defined in claim 1, wherein the plurality of possible media contents are differentiated by different colors, and wherein the particular media content is presented in the user interface as a display screen background, or an object shown as a display screen foreground, being of a certain color among said different colors.

14. The communication device as defined in claim 1, wherein the plurality of possible media contents are differentiated by different sounds, and wherein the particular media content is presented in the user interface as a certain sound among said different sounds.

15. The communication device as defined in claim 1, wherein the plurality of possible media contents represent different graphical objects, each graphical object being composed of a combination of a limited number of differently sized and/or oriented blocks.

16. The communication device as defined in claim 1, wherein the communication identifier of the received short-range wireless communication signal is one of the following:
a communication address representing the other communication device;
a service indicator indicating one of a plurality of communication services supported by a communication protocol that the received short-range wireless communication signal complies with;
a channel indicator indicating one of a plurality of communication channels supported by a communication protocol that the received short-range wireless communication signal complies with;
a session key or other key data representing a communication session being established between the communication device and the other communication device; and
a session key or other key data being used for encrypted data communication between the communication device and the other communication device.

17. The communication device as defined in claim 1, wherein the communication device is one of the following:
a mobile communication device;
a mobile phone;
a smart phone;
a tablet computer;
a personal digital assistant;
a portable computer;
smart glasses;
a smart watch; and
a smart bracelet.

18. A method of verifying an action to be performed by a communication device capable of short-range wireless communication, the method comprising:
receiving a short-range wireless communication signal from another communication device;
reading a communication identifier of the received short-range wireless communication signal;
determining, based on the communication identifier, a particular audio/visual/audiovisual media content among a plurality of possible media contents, wherein said determining occurs locally in the communication device using the communication identifier, or a part thereof, as a reference by means of which the particular audio/visual/audiovisual media content can be identified, chosen or generated locally in the communication device;
controlling a user interface of the communication device to present the particular media content to a user of the communication device;
controlling the user interface to receive an input from the user as an inspection result of the user's verification of a match between the presented particular media content and a corresponding particular media content being presented by or at the other communication device; and
conditionally upon having received the input from the user, causing the communication device to perform the action.

19. The method as defined in claim 18, wherein the plurality of possible media contents represents a finite group of different media contents, each individual media content in the finite group of different media contents being such that, upon being presented as said particular media content in the user interface of the communication device, said individual media content is distinctly discernible from all other media contents in the finite group of different media contents by the user of the communication device.

20. The method as defined in claim 18,
wherein the short-range wireless communication signal is received during connectivity advertisement or discovery, and
wherein causing the communication device to perform the action involves establishing a short-range wireless communication session with the other communication device.

21. The method as defined in claim 18, wherein the method further comprises:
receiving a second short-range wireless communication signal from a second other communication device, the short-range wireless communication signal and the second short-range wireless communication signal being received during connectivity advertisement or discovery,
reading a second communication identifier of the received second short-range wireless communication signal;
determining, based on the second communication identifier, a second particular audio/visual/audiovisual media content among the plurality of possible media contents;
controlling the user interface to present the other communication device and the second other communication device as alternatives for selection, represented by the particular media content and the second particular media content, respectively;

controlling the user interface to receive the input as the user's selection of either of the other communication device and the second other communication device; and causing the communication device to perform the action by establishing a short-range wireless communication session with the selected other communication device or second other communication device, as indicated by the input from the user.

22. The method as defined in claim 18, wherein the short-range wireless communication signal is received as data traffic over an established short-range wireless communication session with the other communication device, the data traffic comprising a service invitation from the other communication device, and wherein causing the communication device to perform the action involves participating in a digital service with the other communication device over the short-range wireless communication session the digital service involving one of the following:

a payment transaction;

a transaction for transfer of funds;

an information exchange;

an identity authentication; and an access authorization.

23. The method as defined in claim 18, wherein the short-range wireless communication signal is received as data traffic over an established short-range wireless communication session with the other communication device, the data traffic comprising a data request from the other communication device, and wherein causing the communication device to perform the action involves sending a data response to the other communication device.

24. The method as defined in claim 18, wherein causing the communication device to perform the action involves invoking or executing software or firmware instructions stored locally in the communication device.

25. The method as defined in claim 18, wherein causing the communication device to perform the action involves broadband communication with a remote communication device; and wherein the performed action is part of a remote digital service that is provided by the remote communication device and involves one of the following:

a payment transaction;

a transaction for transfer of funds;

an information exchange;

an identity authentication; and an access authorization.

26. The method as defined in claim 18, wherein the particular audio/visual/audiovisual media content is determined by:

calculating a hash value by inputting the communication identifier, or a part thereof, to a hash function; and using the calculated hash value, or a part thereof, to identify, choose or generate the particular audio/visual/audiovisual media content among the plurality of possible media contents.

27. The method as defined in claim 18, wherein the particular audio/visual/audiovisual media content is determined by:

searching a look-up table by using the communication identifier, or a part thereof, as index;

retrieving a matching entry in the look-up table; and using the retrieved matching entry, or a part thereof, to identify, choose or retrieve the particular audio/visual/audiovisual media content among the plurality of possible media contents.

28. The method as defined in claim 18, wherein the plurality of possible media contents:

a) are differentiated by different colors, and wherein the particular media content is presented in the user interface as a display screen background, or an object shown as a display screen foreground, being of a certain color among said different colors; or b) are differentiated by different sounds, and wherein the particular media content is presented in the user interface as a certain sound among said different sounds; or c) represent different graphical objects, each graphical object being composed of a combination of a limited number of differently sized and/or oriented blocks.

29. The method as defined in claim 18, wherein the communication identifier of the received short-range wireless communication signal is one of the following:

a communication address representing the other communication device;

a service indicator indicating one of a plurality of communication services supported by a communication protocol that the received short-range wireless communication signal complies with;

a channel indicator indicating one of a plurality of communication channels supported by a communication protocol that the received short-range wireless communication signal complies with;

a session key or other key data representing a communication session being established between the communication device and the other communication device; and a session key or other key data being used for encrypted data communication between the communication device and the other communication device.

30. A tangible computer readable medium having stored thereon a computer program comprising computer program code for performing the method according to claim 18 when the computer program code is executed by a processing device.

31. A communication device comprising:

a processing device;

a user interface; and a short-range wireless communication transceiver, wherein the short-range wireless communication transceiver is configured for:

receiving a short-range wireless communication signal from another communication device, and wherein the processing device is configured for:

reading a communication identifier of the received short-range wireless communication signal;

determining, based on the communication identifier, a particular audio/visual/audiovisual media content among a plurality of possible media contents;

controlling the user interface to present the particular media content to a user of the communication device;

controlling the user interface to receive an input from the user; and conditionally upon having received the input from the user, causing the communication device to perform an action by participating in one of the following:

a payment transaction, a transaction for transfer of funds, an information exchange, an identity authentication, and an access authorization.

32. A method of verifying an action to be performed by a communication device capable of short-range wireless communication, the method comprising:

receiving a short-range wireless communication signal from another communication device;

reading a communication identifier of the received short-range wireless communication signal;

determining, based on the communication identifier, a particular audio/visual/audiovisual media content among a plurality of possible media contents;

controlling a user interface of the communication device to present the particular media content to a user of the communication device;

controlling the user interface to receive an input from the user; and conditionally upon having received the input from the user, causing the communication device to perform the action by participating in one of the following:

a payment transaction,
a transaction for transfer of funds,
an information exchange,
an identity authentication, and
an access authorization.

* * * * *